US011443568B1

(12) United States Patent
Amireddy et al.

(10) Patent No.: US 11,443,568 B1
(45) Date of Patent: Sep. 13, 2022

(54) PRESENTATION OF MESSAGES BY AN IN-VEHICLE HEAD UNIT

(71) Applicant: T-Mobile Innovations LLC, Overland Park, KS (US)

(72) Inventors: Sridhar Reddy Amireddy, Overland Park, KS (US); Srinivasa Raju Penmetsa, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 587 days.

(21) Appl. No.: 15/825,092

(22) Filed: Nov. 28, 2017

(51) Int. Cl.
*G07C 5/08* (2006.01)
*H04H 20/86* (2008.01)
*G07C 5/00* (2006.01)
*H04W 4/70* (2018.01)

(52) U.S. Cl.
CPC .......... *G07C 5/0825* (2013.01); *G07C 5/006* (2013.01); *H04H 20/86* (2013.01); *H04W 4/70* (2018.02)

(58) Field of Classification Search
CPC ........ G07C 5/004; G07C 5/006; G07C 5/008; G07C 5/08; G07C 5/0816; G07C 5/0833; B60R 16/0236; F02B 77/084; H04W 4/48; H04W 4/40; G01F 9/00; H04T 2001/209; H04T 2001/2096
See application file for complete search history.

(56) References Cited

U.S. PATENT DOCUMENTS

| | | | | |
|---|---|---|---|---|
| 6,993,421 B2* | 1/2006 | Pillar | ............. | A62C 27/00 701/29.4 |
| 8,718,862 B2* | 5/2014 | Gwozdek | ............. | G07C 5/008 701/29.9 |
| 10,325,420 B1* | 6/2019 | Moon | ............. | H04W 4/02 |
| 10,366,370 B1* | 7/2019 | Binion | ............. | G07C 5/008 |
| 2005/0275515 A1* | 12/2005 | Morris | ............. | G08G 1/205 340/438 |
| 2007/0129064 A1* | 6/2007 | Batchik | ............. | G07C 5/008 455/414.1 |
| 2009/0106036 A1* | 4/2009 | Tamura | ............. | G06Q 10/20 705/305 |

(Continued)

OTHER PUBLICATIONS

Mostafa Anwar Taie, M. Diab and M. ElHelw, "Remote prognosis, diagnosis and maintenance for automotive architecture based on least squares support vector machine and multiple classifiers," 2012, 2012 IV International Congress on Ultra Modern Telecommunications and Control Systems, pp. 128-134 (Year: 2012).*

*Primary Examiner* — Sarah M Monfeldt
*Assistant Examiner* — Michael J. Monaghan (57) ABSTRACT

A head unit configured for use in a motor vehicle. The head unit comprises a processor, a cellular radio transceiver, a memory, and a notification application stored in the memory. When executed by the processor the notification application receives a recall notification message via the cellular radio transceiver, wherein the recall notification message comprises a definition of text to display on a screen communicatively coupled with the head unit, a definition of buttons to present on the screen, and a definition of action to take when a button is activated, stores the recall notification message in the memory, determines that rules for safe presentation of the notification are satisfied, presents the text defined in the message, receives a control input from one of the buttons defined by the message, and performs the action to be taken when the button is activated defined in the message.

19 Claims, 6 Drawing Sheets

(56) References Cited

U.S. PATENT DOCUMENTS

| | | | |
|---|---|---|---|
| 2010/0060481 A1* | 3/2010 | Habaguchi | H04H 20/57 340/901 |
| 2012/0203557 A1* | 8/2012 | Odinak | G01C 21/3608 704/270.1 |
| 2013/0260723 A1* | 10/2013 | Chander | G07C 5/008 455/412.1 |
| 2013/0332023 A1* | 12/2013 | Bertosa | G07C 5/0808 701/29.4 |
| 2014/0324275 A1* | 10/2014 | Stanek | G07C 5/008 701/31.4 |
| 2015/0191122 A1* | 7/2015 | Roy | G08G 1/096827 340/439 |
| 2015/0266377 A1* | 9/2015 | Hampiholi | H04W 4/14 455/466 |
| 2016/0035146 A1* | 2/2016 | Knight | G07C 5/006 701/29.1 |
| 2016/0042576 A1* | 2/2016 | Fischer | G05B 23/0283 701/29.4 |
| 2016/0110934 A1* | 4/2016 | Ernst | G07C 5/0808 701/29.6 |
| 2017/0127230 A1* | 5/2017 | Enriquez | H04L 67/18 |
| 2018/0141494 A1* | 5/2018 | Gowda | G07C 5/0825 |
| 2019/0051414 A1* | 2/2019 | Lyubich | G16H 50/20 |
| 2019/0164360 A1* | 5/2019 | Pursifull | G07C 5/008 |

\* cited by examiner

PRESENTATION OF MESSAGES BY AN IN-VEHICLE HEAD UNIT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles increasingly are providing wireless communications based functionality. In an embodiment, a head unit may be installed in a motor vehicle that provides a variety of functionality that depends at least partly on wireless communications connectivity via a cellular network, for example voice communications, web browsing, mobile applications, and other applications. A subscription to a wireless communication service may be established to enable wireless connectivity of the head unit with the cellular network. The head unit may be referred to in some contexts as a telematics unit. The head unit may be connected to systems and devices in the vehicle through a communication bus.

SUMMARY

In an embodiment, a method of performing a vehicle recall notification program is disclosed. The method comprises identifying a plurality of motor vehicles potentially subject to a recall notification by an application executing on a computer system, for each motor vehicle potentially subject to the recall notification and using a vehicle identification number (VIN) of the vehicle by the application to access an entry in a vehicle data store that identifies a communication channel for distributing the recall notification, wherein at least some of the entries identify an in-vehicle head unit as the communication channel for distributing the recall notification. The method further comprises, for each motor vehicle associated with an in-vehicle head unit recall notification communication channel, accessing a service record from a vehicle service data store and determining by the application that the recall has not been performed and for each motor vehicle associated with an in-vehicle head unit recall notification communication channel that has not had the recall performed, transmitting a recall notification message by the application to the head unit of the motor vehicle via a wireless cellular network, where the recall notification message comprises a definition of text to display on a screen communicatively coupled with the head unit, a definition of buttons to present on the screen, and a definition of action to take when a button is activated, whereby a recall notification is communicated to an owner of a motor vehicle and a vehicle recall notification completion rate is increased.

In another embodiment, a head unit configured for use in a motor vehicle is disclosed. The head unit comprises a processor, a cellular radio transceiver, a memory, and a notification application stored in the memory. When executed by the processor the notification application receives a recall notification message via the cellular radio transceiver, wherein the recall notification message comprises a definition of text to display on a screen communicatively coupled with the head unit, a definition of buttons to present on the screen, and a definition of action to take when a button is activated, stores the recall notification message in the memory, determines that rules for safe presentation of the notification are satisfied, presents the text defined in the recall notification message, receives a control input from one of the buttons defined by the recall notification message, and performs the action to be taken when the button is activated defined in the recall notification message.

In yet another embodiment, a method of managing maintenance scheduling is disclosed. The method comprises accessing a maintenance history of a motor vehicle by an application executing on a computer in a maintenance data store based on an identity of the vehicle, comparing the maintenance history of the motor vehicle to a maintenance schedule for a model of the vehicle by the application, and, based on the comparison of the maintenance history of the motor vehicle to the maintenance schedule, determining that a maintenance activity is due by the application. The method further comprises determining a preferred maintenance service location for the motor vehicle by the application, based on the maintenance activity that is due, determining a plurality of service appointments by the application, and transmitting a maintenance activity due message by the application to a head unit of the motor vehicle via a wireless network, wherein the maintenance activity due message comprises a definition of text to display on a screen communicatively coupled with the head unit, a definition of buttons to present on the screen, a definition of action to take when a button is activated, wherein the text to be displayed comprises in part information about the plurality of service appointments and the identity of the preferred maintenance service location and the action to take when at least one of the buttons is activated is accepting one of the plurality of service appointments. This method may result in periodic maintenance being completed more timely thereby extending operating lives of vehicles and conserving resources.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A new system of handling motor vehicle recall notifications is taught herein. The existing motor vehicle recall notification system is both inefficient and unreliable. Recall notifications are mailed through the US mail. This mail can be lost. The mail can be addressed to the wrong location. The owner of the vehicle may have changed postal address but not left a forwarding address and not informed the vehicle manufacturer of the change of address. The vehicle may have been sold by the original owner to another owner. The recall notification may get to the owner of the vehicle, but the paper notification may be lost by the owner.

Some motor vehicles are provided with a head unit or telematics unit that has a cellular radio transceiver. The present disclosure teaches creating an electronic recall notification message that is transmitted to the head unit in the vehicle that is the subject of the recall notification. The head unit comprises a cellular radio transceiver, a processor, a memory, and a recall notification application that is able to parse and manage the electronic recall notification message. The recall notification message may comprise definitions of text to be displayed on a screen by the head unit, definitions of selection or control buttons to be displayed on the screen by the head unit, and definitions of actions to be performed by the head unit in response to activation of the control buttons. The recall notification application can monitor vehicle operating conditions and present recall notification information contingent on satisfaction of safety rules. For example, the safety rules may restrict the recall notification application from presentation of recall notification text while the vehicle is in motion. The safety rules may promote presentation by the recall notification application of recall notification text shortly after the vehicle has been entered, the engine has been started, but before the vehicle is in motion.

The recall notification application may present information from the recall notification message selectively based on a state of a response of the owner of the vehicle. The recall notification application may first present a summary of the recall notification, for example a brief identification of the equipment in the vehicle that is the subject of the recall and a seriousness of the fault the equipment may suffer from. The recall notification application may prompt the owner of the vehicle to select an acknowledge control input to confirm that he or she has read and understood the initial recall summarization text or description of the recall. On receipt of the acknowledge control input, the recall notification application may build a recall notification acknowledgement message and send the recall notification acknowledgement message to a recall notification server computer via the cellular radio transceiver of the head unit. The recall notification acknowledgement message may be referred to as a recall notification read message in some contexts. If the owner does not acknowledge the recall notification message, the recall notification summary may be presented repeatedly and the owner prompted to select the acknowledge control input. The recall notification message may be presented every time the engine is started or, alternatively, at periodic intervals such as once per day, once per week, once every two weeks, or some other periodic interval. In an embodiment, the recall notification application may prompt the owner to input a personal identity number (PIN) or other authentication code, whereby the acknowledgement of the receipt and viewing of the recall notification message by the owner of the motor vehicle may be confirmed.

The recall notification application may next, after receiving the acknowledge input, present a screen for scheduling a recall procedure to be performed on the motor vehicle at a service center, for example at a vehicle dealership location. The recall notification application may request identification of a preferred service center visited by the motor vehicle from a vehicle maintenance server via the cellular radio transceiver. Alternatively, the recall notification application may prompt the owner to identify a preferred service center or to select a preferred service center from a short list of service centers located proximate to the location of the motor vehicle.

Once a preferred service center is identified, the recall notification application may request a schedule of available appointments for having the subject recall procedure performed at the preferred service center. This may involve communicating with a service scheduling application executing at a server computer located at the preferred service center that manages scheduling of service technicians and scheduling vehicle maintenance and service procedures. The recall notification application may present the available appointments on a screen of the display. The owner may be prompted to select one of the appointments. When the recall notification application receives a selection of an appointment, it may send an appointment reservation message to the service scheduling application. The recall notification application may present reminders of the pending appointment on the display from time to time, for example whenever the engine is first turned on, when the vehicle comes to a stop and is placed in parking gear and/or when the parking brake is set but before the engine is turned off.

It is contemplated that the recall notification system described above can be expanded to perform additional functions. For example, a scheduled maintenance application can be executed on a server operated by a motor vehicle company or by a vehicle service center that generates and sends out notification messages related to scheduled maintenance that is due on a motor vehicle. A notification application executing on the head unit may send reports of mileage of the vehicle to the scheduled maintenance application, for example every 100, every 200 miles, every 500 miles, every 1000 miles, or some other distance. Alternatively, the notification application may update the mileage of the vehicle to the scheduled maintenance application once per week, once per month, or at some other time interval. The scheduled maintenance application can determine an approaching scheduled maintenance procedure, generate an associated notification message, and transmit this scheduled maintenance message to the head unit. The head unit can present the information about the scheduled maintenance and provide a window for selecting and setting a scheduled maintenance appointment with a preferred service center. The head unit may collaborate with a car dealer service center (e.g., a personnel scheduling application executed on a server computer used by the service center or a parent company associated with the service center) to identify skills needed to perform the subject maintenance, access work schedules and availabilities of employees of the service center that have the needed skills, and determine time slots available for performing the needed maintenance based on availability of appropriately skilled employees.

In an embodiment, when a condition light is activated in the motor vehicle (e.g., a "check engine light" is activated), the notification application may build a vehicle equipment state message that indicates that the condition light is active. The head unit may transmit the vehicle equipment state message via the cellular radio transceiver to the maintenance server. The maintenance server may access explanatory information, recommended response information, bundle this information into a vehicle equipment state information message, and send the vehicle equipment state message to the head unit. The notification application may parse the vehicle equipment state information message and present text on the display in the motor vehicle that describes one or more possible causes of the active motor vehicle indicator light and one or more recommended responses.

The system described above can overcome some of the shortcomings of the former "paper-based" recall notice system. It can obviate the problems associated with individuals losing paper recall notices and/or busy individuals forgetting about the recall notices. The system can reduce the burden on individuals of having maintenance completed on their vehicles, either maintenance mandated by a recall notification or maintenance defined by a conventional maintenance schedule, by identifying available time slots for appointments at a service center and offering a menu of available appointment slots. This system increases the likelihood that recall procedures will be completed, improving the overall safety of the base of vehicles driving on our roads and thereby increase safety for everyone, not just for the operators of the vehicles subject to the recall notification but also for those driving proximate to those vehicles. Said in another way, the system can increase the recall notification program completion rates for vehicle manufacturers. The system increases the likelihood that needful periodic maintenance is performed timely on vehicles, thereby extending operating lives of vehicles and conserving resources. For example, manufacturing vehicles consumes resources and has an indirect impact on the environment (mining iron ore to produce metals for use in manufacturing vehicles, etc.), extending operating lives of vehicles means a vehicle can be driven more miles, reducing the rate at which new vehicles need to be manufactured to replace retired vehicles, thereby consuming few resources or at least reducing the rate of consumption of resources.

Figure 1:
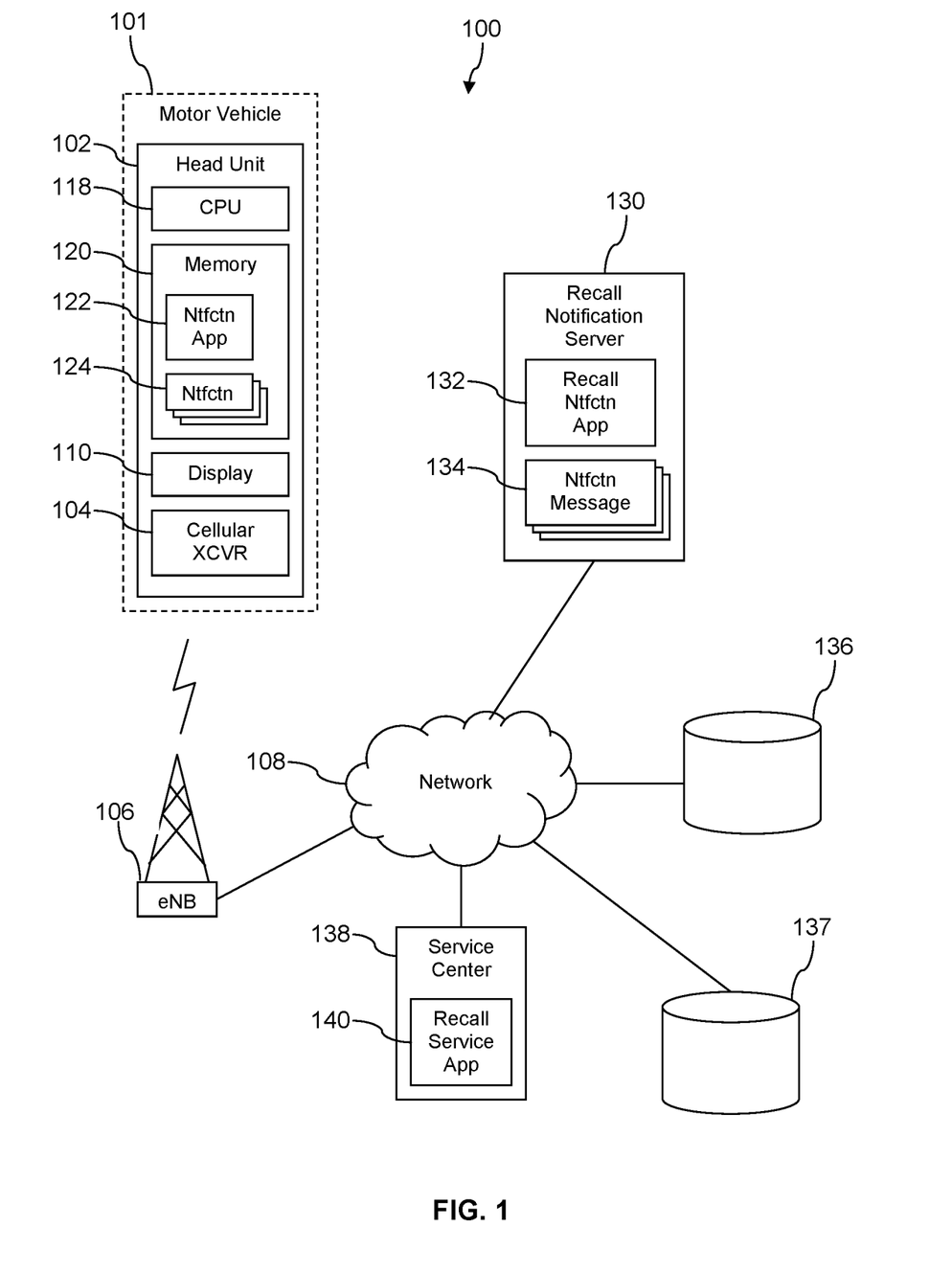
FIG. 1 is a block diagram of a motor vehicle recall notification system according to an embodiment of the disclosure.

Turning now to FIG. 1, a system 100 is described. In an embodiment, the system 100 comprises a motor vehicle 101 having a head unit 102 or telematics unit. The head unit 102 comprises a cellular radio transceiver 104 that can establish a wireless communication link with a cell site 106 and communicate therethrough to a network 108. The head unit 102 further comprises a display 110, a processor 118, and a memory that stores a recall notification application 122. In an embodiment, the display 110 may be external to the head unit 102 but communicatively coupled to the head unit 102. The cell site 106 may provide a wireless communication link to the cellular radio transceiver 104 according to one or more of a long term evolution (LTE), a code division multiple access (CDMA), a global system for mobile communication (GSM), or a worldwide interoperability for microwave access (WiMAX) wireless communication protocol. The network 108 may comprise one or more public networks, one or more private networks, or a combination thereof. The motor vehicle 101 may be an automobile, a car, a pick-up truck, a sport utility vehicle (SUV), a mini-van, a delivery truck, semi-truck, or other motor vehicle.

The system 100 further comprises a recall notification server 130 that executes a recall notification application 132 and generates notification messages 134. The recall notification server 130 identifies a plurality of motor vehicles that are potentially subject to a given recall notification. A recall may be issued for motor vehicles to repair or replace equipment in the vehicles that may be faulty or subject to failure. A recall may be associated with equipment that can under some conditions cause the motor vehicle to be unsafe or to experience diminished safety. Under some circumstances, special rules and procedures may apply to the process of conducting a recall and to the process of sending out recall notifications. The recall notification application 132 may use the VIN numbers of the vehicles to search a data store 136 to learn what communication channel to use to communicate with an owner of the motor vehicles subject to the recall. For example, some motor vehicles 101 subject to the recall may have the head unit 102 installed while other motor vehicles subject to the recall may not have the head unit 102 installed. Along with determining that some of the plurality of vehicles subject to the recall have head units 102 installed, the recall notification application 132 obtains their phone number and/or internet protocol (IP) address whereby to communicate wirelessly with them.

The recall notification application 132 may search a service record data store 137 for motor vehicles to determine if the procedure associated with the recall may have already been completed on some of the vehicles or an equivalent procedure have been performed on the vehicle (e.g., before a formal recall program is fielded, some vehicles may experience vehicle equipment problems that are addressed by a service center by making a repair that is substantially the same as the formal recall repair procedure rolled-out by the vehicle manufacturer). Vehicles that have received the recall procedure or an equivalent repair may be omitted from the recall process and may not be sent recall notifications. In some cases, however recall notifications may be sent out to the owner of a vehicle notwithstanding that a recall procedure or equivalent has been performed on the vehicle, for example for purposes of soliciting and obtaining an acknowledgement of the recall pursuant to standing procedures or to satisfy legal requirements of a recall. The recall notification application 132 may prepare recall notification messages for motor vehicles 101. The recall notification message prepared for a motor vehicle 101 that has not received the recall procedure may be different from the recall notification message prepared for a motor vehicle 101 that has received the recall procedure or equivalent.

Figure 2:
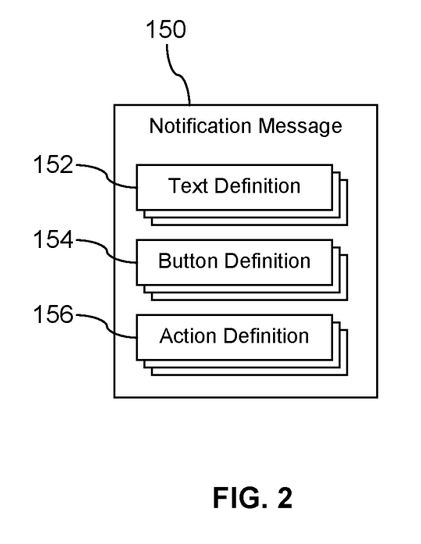
FIG. 2 is a block diagram of a notification message according to an embodiment of the disclosure.

Turning now to FIG. 2, a recall notification message 150 is described. In an embodiment, the recall notification message 150 comprises one or more text definitions 152 that define text that is to be presented on the display 110, one or more button definitions 154 that define selectable input buttons that are to be presented on the display 110, and one or more action definitions 156 that define what action or instructions the recall notification application 122 is to perform in response to receiving an input indicating activation of one of the defined input buttons. The text definitions 152 may comprise text to be presented on the display 110 at different times and/or when a user interaction with a recall is at different states. The text definitions 152 may comprise information that indicates where the subject text is to be presented, for example proximate to what input buttons and/or at what location on the display 110. The button definitions 154 may identity where on the display 110 the subject button is to be presented and what its function is. Some button definitions 154 may define buttons that may be displayed after some other defined button is activated. The action definitions 156 define what actions occur when a button associated with the action definition 156 is activated. In some cases the action definitions 156 may comprise instructions to be executed by the recall notification application 122. In some cases the action definitions 156 may stipulate that on activation one or more texts among the text definitions 152 may be presented on the display 110 and one or more buttons among the button definitions 154 may be presented on the display 110. Some of the action definitions 156, when activated, may cause a message to be created by the recall notification application 122 and transmitted via the cellular radio transceiver to the recall notification application 132 executing on the recall notification server 130.

With reference now to both FIG. 1 and FIG. 2, when a notification message 150 is transmitted by the recall notification server 130 to the head unit 102, via the network 108 and the cell site 106, the head unit 102 may store the notification message 150 as a recall notification message 124 in the memory 120. Before transmitting the recall notification message 150 to the head unit 102, the recall notification server 130 may determine if the head unit 102 is turned on and accessible from the cell site 106. The recall notification server 130 may queue recall notification messages 150 and send them out to head units 102 as conditions and communication connectivity of the head units 102 allow.

The recall notification application 122 executing on the head unit 102 does not execute all the time. It does not execute when the head unit 102 is not in normal operating mode, for example, and the head unit 102 is not in normal operating mode when the motor vehicle 101 is turned off (in an embodiment, the head unit 102 may operate in a provisional or low-power mode of operation when the engine is turned off, for example to respond to remote commands such as door unlock wireless commands, door lock wireless commands, or other remote commands). When the recall notification application 122 is executing it may determine if a recall notification message 124 has been received and what the processing status of the recall notification message 124 is.

The recall notification message 124, 150 may provide information (e.g., action definitions 156) that promotes the recall notification application 122 interworking with a service center 138 and/or a recall service application 140 to schedule a recall procedure to be performed at the service center on the motor vehicle 101. The recall notification application 122 may access a service appointment schedule data store 137 via the recall service application 140 to establish an appointment schedule. The appointment schedule data store 137 may comprise information about schedules of different technicians, skills of the technicians, existing appointments, and descriptions of work to be completed associated with different recall procedures. The recall service application 140 may determine availabilities of technicians having the skills needed to complete the recall procedure based on accessing and analyzing the data store 137. The recall service application 140 can provide a list of available appointment times at the service center for the subject recall procedure. The recall notification application 122 can interwork via the display 110 with an owner of the motor vehicle to schedule an appointment with the service center.

For example, the notification application 122 receives a control input from a button initiating an appointment set-up with a service center. The notification application 122 transmits a service appointment request message via the cellular radio transceiver 104 to the service center 138 or the recall notification application 132 executing on the recall notification server 130. The notification application 122 receives service appointment schedule information via the cellular radio transceiver and presents service appointment schedule information on the display 110 of the motor vehicle 101. The notification application 122 receives a control input from a button selecting a service appointment schedule time and transmits a service appointment commit message via the cellular radio transceiver 104 to the service center 138 or the recall notification application 132 executing on the recall notification server 130. The requested service appointment is committed, for example in the data store 136 or the data store 137. The service center 138 or the recall notification server 130 sends a service appointment confirm message to the head unit 102 via the cellular radio transceiver 104. The notification application 122 receives a service appointment confirm message via the cellular radio transceiver 104.

A recall notification may progress through a series of states or statuses. The recall notification may have an initial status (i.e., built or created by the recall notification application 132 executing on the recall notification server but not yet transmitted), progress from the initial status to a transmitted status (i.e., transmitted to the head unit 102 by the recall notification server 130), progress from transmitted status to received status (i.e., head unit 102 sends confirmation of receipt of the recall notification message to the recall notification server 130), progress from the received status to the acknowledged status, progress from the acknowledged status to the recall service appointment scheduled status, and from the scheduled status to recall service completed status. In other embodiments the recall notification may pass through other states. For example, a recall notification may progress through a plurality of states between the received state and the acknowledged state, for example a first presentation state, a second presentation state, a third presentation state, etc. On each state transition of the recall notification, excepting the transition from the initial state to the transmitted state, the head unit 102 may send a message to the recall notification server 130 indicating the state transition. In an embodiment, the transition from the service scheduled status to the service completed status may be reported to the recall notification server 130 by either the head unit 102 or the service center 138 or both.

Figure 3:
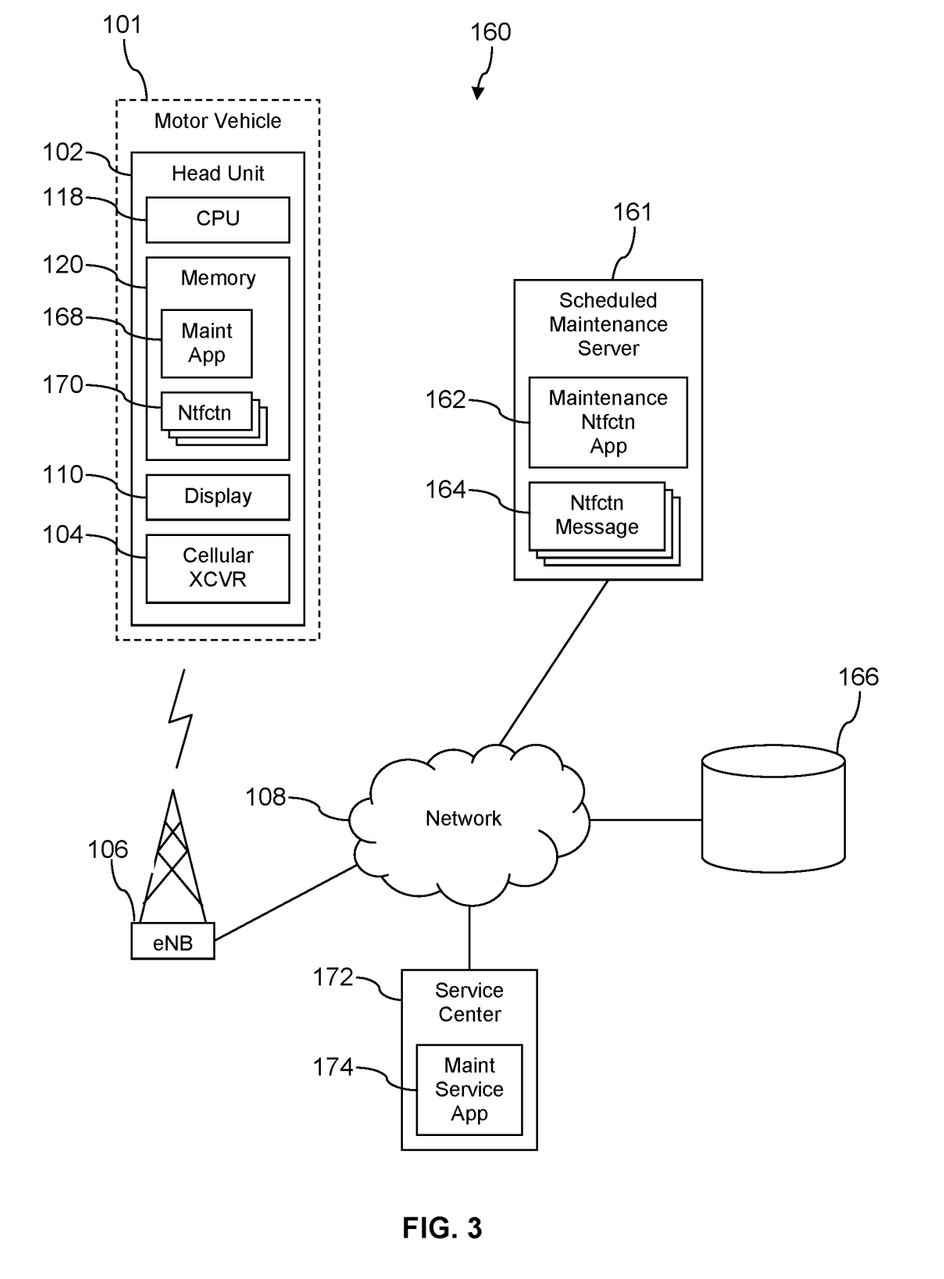
FIG. 3 is a block diagram of a communication system according to an embodiment of the disclosure.

Turning now to FIG. 3, a communication system 160 is described. The communication system 160 may comprise several elements that are similar to those described further above. In an embodiment, system 160 comprises a scheduled maintenance server and a maintenance notification application 162 that generates maintenance notification messages 164. The maintenance notification messages 164 may have a format substantially similar to the recall notification message 150, with the distinction that the text definitions 152, button definitions 154, and action definitions 156 relate to scheduled maintenance actions rather than to recall notification actions. The maintenance notification application 162 may analyze a maintenance data store 166 to determine that the motor vehicle 101 is due or will soon be due to have a scheduled maintenance activity performed. This maintenance activity falling due may be related to an aging criteria, a mileage criteria, or both. For example, some scheduled maintenance is recommended every 5,000 miles or every three months, whichever comes first. Hoses may be scheduled for replacement after 100,000 miles or after 10 years of use, whichever comes first.

In an embodiment, the maintenance notification application 168 executing on the head unit 102 may report accumulated mileage of the motor vehicle 101 occasionally to the maintenance notification application 162 executing on the scheduled maintenance server 161, for example once per week, once every two weeks, once per month, or at some other interval. The maintenance notification application 168 executing on the head unit 102 may report accumulated mileage of the motor vehicle 101 occasionally to the maintenance notification application 162 executing on the scheduled maintenance server 161, for example every 100 miles, every 200 miles, every 300 miles, every 500 miles, or some other distance.

The maintenance notification application 162 executing on the scheduled maintenance server 161 may respond to receiving the mileage updates from the maintenance notification application 168 executing on the head unit 102 by reevaluating if any item of scheduled maintenance is due for the motor vehicle 101. Alternatively, the maintenance notification application 162 may have predetermined what the next mileage trigger was for the next scheduled maintenance application and compare the accumulated mileage report to the predetermined mileage notification trigger. If the accumulated mileage of the motor vehicle 101 has reached or surpassed the predetermined mileage notification trigger, the maintenance notification application 162 generates a maintenance notification message 164 and sends it to the maintenance notification application 168 executing on the head unit 102. In an embodiment, the maintenance notification application 162 generates the maintenance notification message 164 and queues it either on the scheduled maintenance server 161 or in the scheduled maintenance data store 166 and sends the maintenance notification message 164 later, for example when the head unit 102 is turned on in normal operating mode (i.e., the engine of the motor vehicle 101 is turned on. The maintenance notification application 162 may store received mileage updates in the scheduled maintenance data store 166 and process mileage updates received from a plurality of head units 102 in a batch processing mode of operation, for example once per hour, once per day, or once per week.

When the maintenance notification application 168 executing on the head unit 102 receives a maintenance notification message it may store it as a maintenance notification message 170 in the memory 120 of the head unit 102. The maintenance notification application 168 may parse the maintenance notification message 170 and present text and buttons on the display 110 and respond to user input based on the text definitions 152, button definitions 154, and action definitions 156 stored in the maintenance notification message 170. The user may select buttons that initiate a communication session with a maintenance center server 172 and a maintenance server application 174 to schedule an appointment to have the scheduled maintenance indicated by the maintenance notification message 170. The maintenance server application 174 may send information to the maintenance notification application 168 executing on the head unit 102 indicating a projected cost of the scheduled maintenance along with an indication of available appointment times.

In an embodiment, the maintenance notification application 162 executing on the scheduled maintenance server 161 may send out maintenance notification messages 164 in advance of maintenance action falling due. For example, the maintenance notification application 162 may send out a notification that battery change maintenance is due in two months and provide an estimated cost of this maintenance action. For example, the maintenance notification application 162 may send out a notification that clutch replacement is due in 5,000 miles and another notification of the impending clutch replacement 2,000 miles before the clutch replacement is due, along with an estimated cost of this maintenance action. These advance notifications may promote the owner of the motor vehicle 101 better planning financing of the scheduled maintenance. These advance notifications may help the owner feel better about the manufacturer of the motor vehicle 101, because some people get irritated when a costly item of maintenance is sprung on them with little notice.

In an embodiment, the maintenance notification application 168 may further gather information on conditions in the motor vehicle 101 and report these to the scheduled maintenance server 161 which may store the data in the scheduled maintenance data store 166. This information collected by the maintenance notification application 168 may comprise parameter values such as operating measurements of the motor vehicle 101 or extreme values of the operating measurements (maximum engine temperature, minimum non-starting voltage of battery, etc.). This information collected by the maintenance notification application 168 may comprise alert conditions, such as check engine condition, low oil condition, battery not charging condition, and others.

The maintenance notification application 162 or another application executing on the scheduled maintenance server 161 may send a message to the maintenance notification application 168 executing on the head unit 102 for presentation on the display that provides some description of the condition to the driver of the motor vehicle 101. For example, the check engine light sometimes alarms drivers and they fear that their engine is ready to break or even explode. They are frightened and don't know what to do. In many conditions, however, the check engine condition is rather benign and not a cause for fear. The check engine condition may arise because a fuel cover has not been fully sealed. While it may be desirable to remedy that situation by fully sealing the fuel cover, it is not generally a cause for serious fear or alarm. The check engine condition may arise because an O2 sensor in the motor vehicle 101 has failed and needs replacement. Again, while it may be desirable to replace a failed O2 sensor in due time so that the emissions system of the motor vehicle 101 operates effectively, it is not generally a cause for serious fear or alarm. In neither case should a woman with a young baby abandon her car because the check engine light is on and walk through 100 degree temperature 5 miles along a country road to get to her home, fearing her car is about to explode and kill her baby and/or herself.

The message presented on the display 110 may indicate a list of likely causes for the alarmed condition. The message presented can further suggest remedial actions and provide some indication of the urgency of performing the remedial actions. For example, a check engine light may be associated with text that recommends taking the motor vehicle 101 to a preferred service center within seven days to have the condition diagnosed and acted upon if tightening the fuel cover does not lead to the check engine light going out first. For example, a low oil light may be associated with text urging the driver to pull the car over at the soonest opportunity and check the oil level in the engine. The message may present a brief description of the engine oil dip stick, where it is located, how to remove it, and how to determine engine oil level by looking at the end of the stick. The message may further present instructions about how to add additional engine oil in the event the engine is in fact low. The message may provide a button to select to arrange for a service technician to deliver extra engine oil to the location of the motor vehicle 101 or to arrange for a tow truck to be routed to the location of the motor vehicle 101 to retrieve it to a service center.

Figure 4:
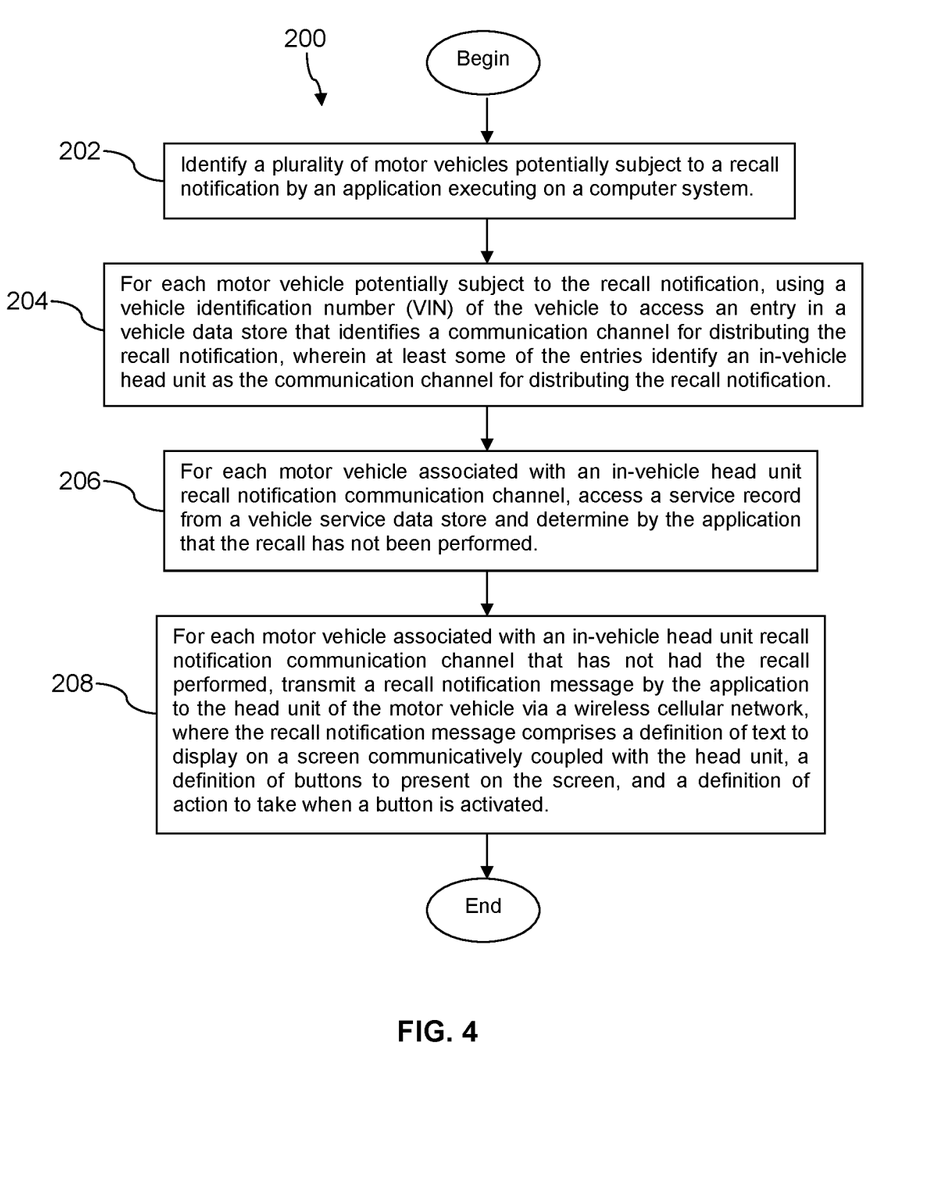
FIG. 4 is a flow chart of a method according to an embodiment of the disclosure.

Turning now to FIG. 4, a method 200 is described. At block 202, identify a plurality of motor vehicles potentially subject to a recall notification by an application executing on a computer system. At block 204, for each motor vehicle potentially subject to the recall notification, using a vehicle identification number (VIN) of the vehicle to access an entry in a vehicle data store that identifies a communication channel for distributing the recall notification, wherein at least some of the entries identify an in-vehicle head unit as the communication channel for distributing the recall notification. At block 206, for each motor vehicle associated with an in-vehicle head unit recall notification communication channel, access a service record from a vehicle service data store and determine by the application that the recall has not been performed. At block 208, for each motor vehicle associated with an in-vehicle head unit recall notification communication channel that has not had the recall performed, transmit a recall notification message by the application to the head unit of the motor vehicle via a wireless cellular network, where the recall notification message comprises a definition of text to display on a screen communicatively coupled with the head unit, a definition of buttons to present on the screen, and a definition of action to take when a button is activated.

The recall notification message may comprise a definition of an action that causes the head unit to create the recall notification read message and to send the recall notification read message to the application. The recall notification message may comprise a first definition of text to display that describes the equipment in the motor vehicle that is the object of the recall notification and describes a potential fault of the equipment. The recall notification message may comprise a definition of an action associated with a definition of a button, where the action is to set an appointment with a service center to have a recall operation performed on the motor vehicle. In an embodiment, the application further receives a recall notification read message from a head unit of a motor vehicle by the application and stores the recall notification read message in the vehicle data store. Method 200 may increase a vehicle recall notification completion rate, for example a vehicle recall notification completion rate for a single recall notification program associated with a manufacturer or vehicles or an aggregate vehicle recall notification completion rate for a plurality of recall notification programs associated with a manufacturer of vehicles.

Figure 5:
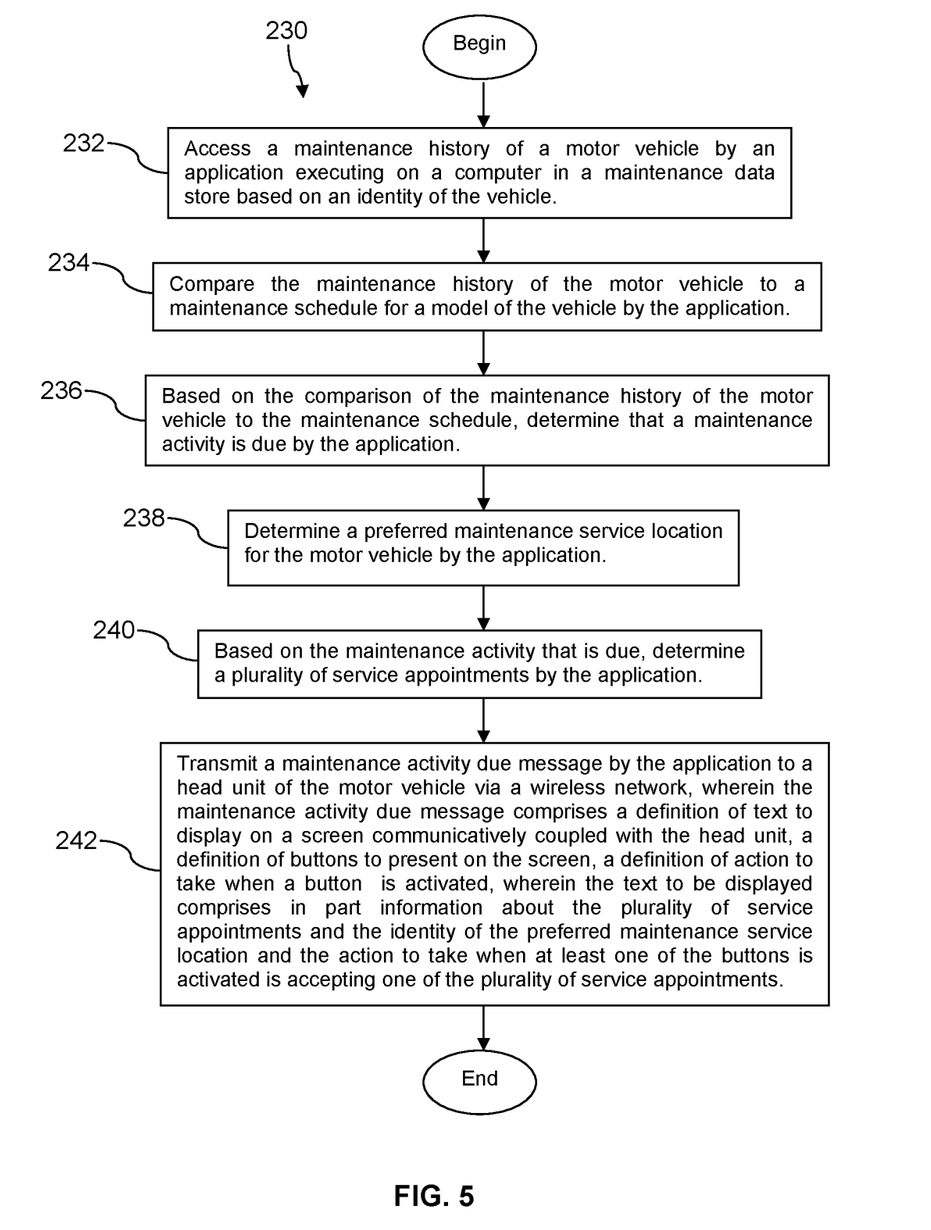
FIG. 5 is a flow chart of another method according to an embodiment of the disclosure.

Turning now to FIG. 5, a method 230 is described. At block 232, access a maintenance history of a motor vehicle by an application executing on a computer in a maintenance data store based on an identity of the vehicle. At block 234, compare the maintenance history of the motor vehicle to a maintenance schedule for a model of the vehicle by the application. At block 236, based on the comparison of the maintenance history of the motor vehicle to the maintenance schedule, determine that a maintenance activity is due by the application. In an embodiment, the maintenance activity that is due is an oil change, a tire rotation, a transmission service, a tune up service, a fuel filter replacement, a thermostat replacement, a hose replacement, a coolant replacement, a radiator flush, a battery replacement, a belt replacement, a water pump replacement, or an engine air filter replacement.

At block 238, determine a preferred maintenance service location for the motor vehicle by the application. At block 240, based on the maintenance activity that is due, determine a plurality of service appointments by the application. At block 242, transmit a maintenance activity due message by the application to a head unit of the motor vehicle via a wireless network, wherein the maintenance activity due message comprises a definition of text to display on a screen communicatively coupled with the head unit, a definition of buttons to present on the screen, a definition of action to take when a button is activated, wherein the text to be displayed comprises in part information about the plurality of service appointments and the identity of the preferred maintenance service location and the action to take when at least one of the buttons is activated is accepting one of the plurality of service appointments.

Method 230 may further comprise receiving a report of accumulated mileage of the motor vehicle by the application and storing the accumulated mileage of the motor vehicle by the application in the maintenance data store, wherein determining that a maintenance activity is due is further based on the accumulated mileage of the motor vehicle. Determining that a maintenance activity is due may further be based on a determination of time since last performance of the maintenance activity. Method 230 may promote more timely completion of periodic maintenance on vehicles thereby extending the operating lives of the vehicles and consequently conserving resources.

Figure 6:
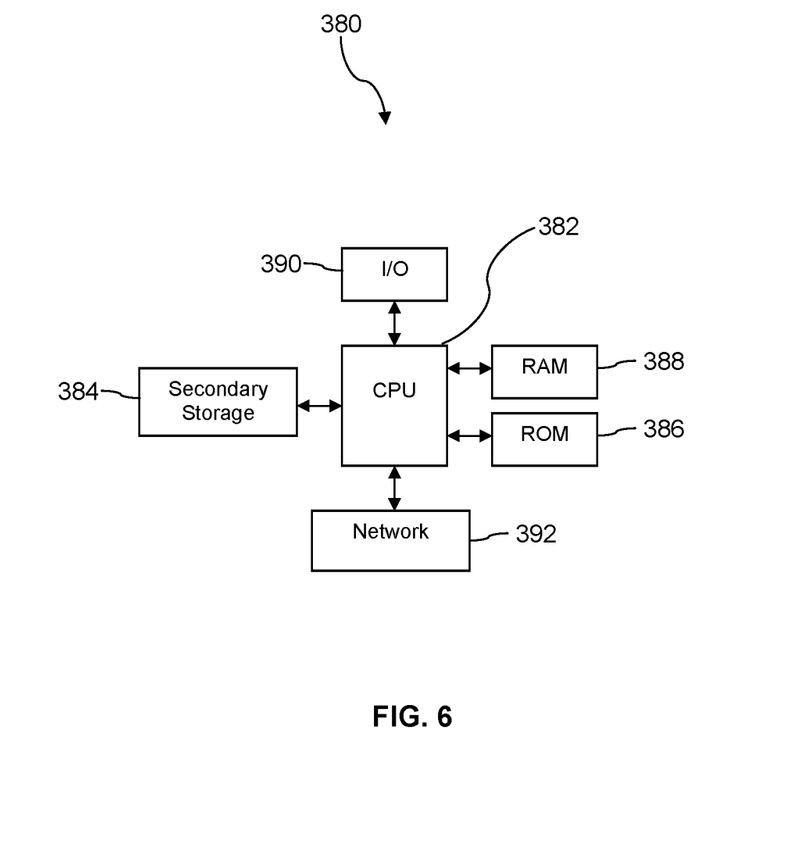
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing a vehicle recall notification program, comprising:
   identifying a plurality of motor vehicles potentially subject to a recall notification by an application executing on a computer system;
   for each motor vehicle potentially subject to the recall notification, using a vehicle identification number (VIN) of the vehicle by the application to access an entry in a vehicle data store that identifies a communication channel for distributing the recall notification, wherein at least some of the entries identify an in-vehicle head unit as the communication channel for distributing the recall notification;
   for each motor vehicle associated with an in-vehicle head unit recall notification communication channel, accessing a service record from a vehicle service data store and determining by the application that the recall has not been performed;
   for each motor vehicle associated with an in-vehicle head unit recall notification communication channel that has not had the recall performed, transmitting a recall notification message by the application to the head unit of the motor vehicle via a wireless cellular network, where the recall notification message comprises a definition of text to display on a screen communicatively coupled with the head unit, a definition of buttons to present on the screen, and a definition of action to take when a button is activated, wherein the recall notification message includes text for multiple notifications each corresponding to states of user engagement with the recall notification message;
   determining, by an in-vehicle application executing via the in-vehicle head unit, a state of user engagement with the recall notification message and selecting, by the in-vehicle application, the text defined in the recall notification message based on the state of user engagement, wherein the recall notification message causes the in-vehicle application executing via the in-vehicle head unit to repeat the display of the text and buttons in a periodic manner until a user enters an authentication code via the in-vehicle head unit to acknowledge receipt and viewing of the recall notification message;
   responsive to a change in the state of user engagement with the recall notification message, transmitting a message from the in-vehicle application to the application indicating a state transition of the state of user engagement with the recall notification message;
   storing, by the application in a database accessible by the application, information indicating the state of user engagement with the recall notification; and
   responsive to the application determining a state transition of the state of user engagement with the recall notification message to a scheduling state, scheduling, by the in-vehicle head unit, a service appointment for performance of remedial action related to the recall notification message.

2. The method of claim 1, wherein each recall notification message is transmitted to the head unit of the motor vehicle according to a long term evolution (LTE), a code division multiple access (CDMA), a global system for mobile communication (GSM), or a worldwide interoperability for microwave access (WiMAX) wireless communication protocol.

3. The method of claim 1, wherein each motor vehicle is one of an automobile, a car, a pick-up truck, a sport utility vehicle (SUV), a mini-van, a delivery truck, or a semi-truck.

4. The method of claim 1, further comprising:
   receiving a recall notification read message from the in-vehicle head unit by the application; and
   storing the recall notification read message in the vehicle data store by the application.

5. The method of claim 4, wherein the recall notification message comprises a definition of an action that causes the head unit to create the recall notification read message and to send the recall notification read message to the application.

6. The method of claim 1, wherein the recall notification message comprises a first definition of text to display that describes the equipment in the motor vehicle that is the object of the recall notification and describes a potential fault of the equipment.

7. A head unit configured for use in a motor vehicle, comprising:
- a processor;
- a cellular radio transceiver;
- a memory; and
- a notification application stored in the memory that, when executed by the processor:
  - receives a recall notification message via the cellular radio transceiver, wherein the recall notification message comprises a definition of text to display on a screen communicatively coupled with the head unit, a definition of buttons to present on the screen, and a definition of action to take when a button is activated, wherein the recall notification message includes text for multiple notifications each corresponding to states of user engagement with the recall notification message,
  - stores the recall notification message in the memory,
  - determines that rules for safe presentation of the notification are satisfied,
  - determines a state of user engagement with the recall notification message and selects the text defined in the recall notification message based on the state of user engagement,
  - repeatedly presents the text defined in the recall notification message in a periodic manner until a user enters an authentication code via the head unit to acknowledge receipt and viewing of the recall notification message,
  - responsive to a change in the state of user engagement with the recall notification message, transmits a message from the head unit indicating a state transition of the state of user engagement with the recall notification message,
  - storing, by the notification application in a database accessible by the notification application, information indicating the state of user engagement with the recall notification; and
  - responsive to the application determining a state transition of the state of user engagement with the recall notification message to a scheduling state, scheduling, by the head unit, a service appointment for performance of remedial action related to the recall notification message.

8. The head unit of claim 7, wherein the motor vehicle is one of an automobile, a car, a pick-up truck, a sport utility vehicle (SUV), a mini-van, a delivery truck, or a semi-truck.

9. The head unit of claim 7, wherein the cellular radio transceiver is configured to establish a wireless communication link with a cell site according to a long term evolution (LTE), a code division multiple access (CDMA), a global system for mobile communication (GSM), or a worldwide interoperability for microwave access (WiMAX) wireless communication protocol.

10. The head unit of claim 7, wherein the notification application:
- responsive to receiving the user acknowledgement of the receipt of the recall notification message, builds a recall notification read message; and
- transmits the recall notification read message via the cellular radio transceiver.

11. The head unit of claim 7, wherein to schedule the service appointment the notification application:
- transmits a service appointment request message via the cellular radio transceiver;
- receives service appointment schedule information via the cellular radio transceiver;
- presents service appointment schedule information on a display of the motor vehicle;
- receives a control input from a button selecting a service appointment schedule time;
- transmits a service appointment commit message via the cellular radio transceiver; and
- receives a service appointment confirm message via the cellular radio transceiver.

12. The head unit of claim 7, wherein the notification application:
- builds a vehicle equipment state message that indicates that the motor vehicle indicator light is active;
- transmits the vehicle equipment state message;
- receives a vehicle equipment state information message; and
- presents text on a display in the motor vehicle that describes a possible cause of the active motor vehicle indicator light and a recommended response.

13. The head unit of claim 7, further comprising a display.

14. A method of managing maintenance scheduling, comprising:
- accessing a maintenance history of a motor vehicle by an application executing on a computer in a maintenance data store based on an identity of the vehicle;
- comparing the maintenance history of the motor vehicle to a maintenance schedule for a model of the vehicle by the application;
- based on the comparison of the maintenance history of the motor vehicle to the maintenance schedule, determining that a maintenance activity is due by the application;
- determining a preferred maintenance service location for the motor vehicle by the application;
- based on the maintenance activity that is due, determining a plurality of service appointments by the application;
- transmitting a maintenance activity due message by the application to a head unit of the motor vehicle via a wireless network, wherein the maintenance activity due message comprises a definition of text to display on a screen communicatively coupled with the head unit, a definition of buttons to present on the screen, and a definition of action to take when a button is activated, wherein the maintenance activity due message includes text and buttons for multiple notifications each corresponding to states of user engagement with the maintenance activity due message;
- determining, by an in-vehicle application executing via the head unit, a state of user engagement with the maintenance activity due message and selecting, by the in-vehicle application, the text and buttons from the multiple notifications based on the state of user engagement, wherein the text to be displayed comprises in part information about the plurality of service appointments and the identity of the preferred maintenance service location and the action to take when at least one of the buttons is activated is accepting one of the plurality of service appointments, and wherein the maintenance activity due message causes the in-vehicle application executing via the head unit to repeatedly display the text and buttons in a periodic manner until a user enters an authentication code via the head unit to acknowledge receipt and viewing of the maintenance activity due message;

responsive to a change in the state of user engagement with the maintenance activity due message, transmitting a message from the in-vehicle application to the application indicating a state transition of the state of user engagement with the maintenance activity due message;

storing, by the application in a database accessible by the application, information indicating the state of user engagement with the maintenance activity due message; and responsive to the application determining a state transition of the state of user engagement with the maintenance activity due message to a scheduling state, scheduling, by the head unit, a service appointment for performance of remedial action related to the maintenance activity due message.

15. The method of claim 14, wherein the motor vehicle is one of an automobile, a car, a pick-up truck, a sport utility vehicle (SUV), a mini-van, a delivery truck, or a semi-truck.

16. The method of claim 14, wherein each maintenance activity due message is transmitted to the head unit of the motor vehicle according to a long term evolution (LTE), a code division multiple access (CDMA), a global system for mobile communication (GSM), or a worldwide interoperability for microwave access (WiMAX) wireless communication protocol.

17. The method of claim 14, wherein the maintenance activity that is due is an oil change, a tire rotation, a transmission service, a tune up service, a fuel filter replacement, a thermostat replacement, a hose replacement, a coolant replacement, a radiator flush, a battery replacement, a belt replacement, a water pump replacement, or an engine air filter replacement.

18. The method of claim 14, further comprising:

receiving a report of accumulated mileage of the motor vehicle by the application;

storing the accumulated mileage of the motor vehicle by the application in the maintenance data store, wherein determining that a maintenance activity is due is further based on the accumulated mileage of the motor vehicle.

19. The method of claim 18, wherein determining that a maintenance activity is due is further based on a determination of time since last performance of the maintenance activity.

* * * * *